US007675649B2

(12) United States Patent
Kawano et al.

(10) Patent No.: US 7,675,649 B2
(45) Date of Patent: Mar. 9, 2010

(54) IMAGE FORMING ELECTROPHOTOGRAPHY APPARATUS SETTING CONDITIONS FOR PROCESS CONTROL BASED ON A TOTAL TONER QUANTITY EQUIVALENT VALUE

(75) Inventors: Hiroshi Kawano, Nara (JP); Masatsugu Nakamura, Nara (JP); Shinji Imagawa, Nara (JP); Takashi Kitagawa, Nara (JP); Masaaki Ohtsuki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 644 days.

(21) Appl. No.: 11/497,674

(22) Filed: Aug. 1, 2006

(65) Prior Publication Data

US 2007/0058199 A1 Mar. 15, 2007

(30) Foreign Application Priority Data

Sep. 12, 2005 (JP) ............................ 2005-264476

(51) Int. Cl.
*H04N 1/407* (2006.01)
*H04N 1/29* (2006.01)
*G03G 15/06* (2006.01)

(52) U.S. Cl. ....................... 358/1.9; 358/3.21; 358/406; 358/300; 399/27; 399/53

(58) Field of Classification Search .................. 358/1.9, 358/3.21, 3.24, 3.26, 504, 406, 300; 399/27, 399/30, 49, 53, 57, 58, 59
See application file for complete search history.

(56) References Cited

U.S. PATENT DOCUMENTS 5,237,370 A 8/1993 Murai
5,475,476 A 12/1995 Murai et al.
5,581,326 A * 12/1996 Ogata et al. .................. 399/30
5,682,572 A 10/1997 Murai et al.

(Continued)

FOREIGN PATENT DOCUMENTS

JP 06-011969 1/1994

(Continued)

*Primary Examiner*—Scott A Rogers
(74) *Attorney, Agent, or Firm*—David G. Conlin; Steven M. Jensen; Edwards Angell Palmer & Dodge LLP

(57) ABSTRACT

A small domain generation section generates a plurality of small domains in a multi-valued image transmitted from an intermediate tone correction section. Each domain is constituted of a plurality of pixels. Counting means counts a signal input value of each pixel. Weighting calculation means corrects each signal input value of the "pixels subjection to toner quantity equivalent value calculation" with reference to the signal input value of the small domain, and reads out a weighting coefficient from the weighting coefficient table based on the modified signal input value. The weighting calculation means multiplies the signal input value by the coefficient so as to convert the signal input value into a toner quantity equivalent value. Accumulating means calculates toner quantity equivalent values for all of the pixels of the multi-valued image. A total toner quantity equivalent value calculation section determines a total toner quantity equivalent value by accumulating all of the toner quantity equivalent values which are individually calculated each time an image is processed. When the total toner quantity equivalent value reaches a predetermined value, conditions for process control is set. On this account, the present invention achieves an image forming apparatus capable of accurate estimation of toner consumption quantity.

9 Claims, 12 Drawing Sheets

U.S. PATENT DOCUMENTS

| | | | | |
|---|---|---|---|---|
| 5,724,627 | A * | 3/1998 | Okuno et al. | 399/27 |
| 6,456,802 | B1 * | 9/2002 | Phillips | 399/27 |
| 6,895,193 | B2 * | 5/2005 | Takamatsu et al. | 399/27 |
| 7,013,093 | B2 * | 3/2006 | Nakazato | 399/27 |
| 7,315,704 | B2 * | 1/2008 | Shin et al. | 399/57 |
| 2006/0007509 | A1 | 1/2006 | Imagawa et al. | |
| 2006/0127108 | A1 | 6/2006 | Okuyama et al. | |
| 2007/0166059 | A1 * | 7/2007 | Kin et al. | 399/27 |
| 2008/0075480 | A1 * | 3/2008 | Konishi et al. | 399/27 |
| 2008/0075482 | A1 * | 3/2008 | Hirota | 399/30 |

FOREIGN PATENT DOCUMENTS

| | | |
|---|---|---|
| JP | 10-239979 | 9/1998 |
| JP | 10-333419 | 12/1998 |
| JP | 2001-296706 | 10/2001 |
| JP | 2001-331797 | 11/2001 |
| JP | 2003-330234 | 11/2003 |
| JP | 2004-163553 | 6/2004 |
| JP | 2004-309533 | 11/2004 |
| JP | 2006-023392 | 1/2006 |

* cited by examiner

| | | | | | |
|---|---|---|---|---|---|
| pix1 | pix2 | pix3 | pix1 | pix2 | pix3 |
| pix4 | pix5 | pix6 | pix4 | pix5 | pix6 |
| pix7 | pix8 | pix9 | pix7 | pix8 | pix9 |

IMAGE FORMING ELECTROPHOTOGRAPHY APPARATUS SETTING CONDITIONS FOR PROCESS CONTROL BASED ON A TOTAL TONER QUANTITY EQUIVALENT VALUE

This Nonprovisional application claims priority under 35 U.S.C. §119(a) on Patent Application No. 264476/2005 filed in Japan on Sep. 12, 2005, the entire contents of which are hereby incorporated by reference.

FIELD OF THE INVENTION

The present invention relates to an image forming device which carries out processing and compensation of image information, such as a photocopier, laser beam printer, facsimile device etc.

BACKGROUND OF THE INVENTION

To carry out image forming, a general electrophotographic apparatus such as a digital photocopier first converts an analog image signal, which is supplied from an image input device such as a scanner, into a digital signal, and the digital signal is then subjected to various processings for digital signals: signal conditioning, image area division, color compensation, black generation, variable power zooming process etc. Then the signal is further subjected to filtering and intermediate tone correction, before outputted as an output image signal.

FIG. 10 shows a control block diagram showing an image processing operation in a conventional digital photocopier. The digital photocopier includes an input signal conditioning section 110, an image area division section 120, a color correction/black generation section 130, a variable power zoom section 140, a spatial filter processing section 150, and an intermediate tone correction section 160, a pixel counting section 170, and a total toner consumption calculating section 180. The foregoing various signal processings are carried out by these sections.

With reference to a flow chart in FIG. 11, the following explains an image processing operation in such a digital photocopier.

First of all, an image of a document is scanned by a scanner or the like (step S101) and is supplied to an image processing device. The analog signal is first converted into a multi-valued digital signal. The digital signal is then supplied to an input signal conditioning section 110, and subjected to various processings such as pre-processing for the subsequent image processing, gamma correction for image adjustment, various conversions etc. (step S102)

The image signal is next supplied to the image area division section 120 which classifies the image data by the type of image, and generates an identification signal (area identification signal) which indicates the area type (step S103). Text area and dot picture are typical examples of the image area. The area identification signal is used to enable separate processings for the respective areas in the spatial filter processing section 150 at a later stage, for example, smooth filtering for a dot area, and edge enhancement filtering for a text area. The area identification signal is also used in conversion of gamma characteristic of intermediate tone into another characteristic with more intense density difference, in the intermediate tone correction section 160 at the next stage.

The color correction/black generation section 130 carries out color correction/black generation (step S104) of a signal. The color correction/black generation is required in a apparatus capable of color image forming. With this processing, an RGB image signal transmitted from the image area division section 130 is converted into a CMYK (cyan, magenta, yellow, black) image signal, which is a final state of signal, and now is ready to be outputted.

The CMYK image signal generated in the color correction/black generation section 130 is subjected to variable power zoom process in the variable power zoom section 140 (step S105), and then supplied to the spatial filter processing section 150 where the CMYK signal is subjected to spatial filtering, that is, an appropriate spatial filtering selected from a spatial filter table according to the area identification signal or setting of image mode (step S106). The spatial filter table is a group of tables of coefficients used for spatial filtering, and one of them is arbitrarily selected according to the circumstances.

The intermediate tone correction section 160 corrects an intermediate tone gamma characteristic of the signal so as to correct the output characteristic in the engine section (step S107).

Further, the resulting signal is supplied to the pixel counting section 170 where each CMYK signal is weighted on pixel basis, and the gradation data is added to the counter (step S108). As a result, an output image signal is transmitted to the engine output side of a LSU or LED (step S110). The total toner consumption calculating 180 calculates a toner consumption quantity for each color out of a gross pixel value (gradation value) counted by the pixel counting section 170 (step S109). The toner consumption quantity thus figured out is used for "toner-near-end" detection or accumulation of toner consumption quantity data.

One of the controls carried out by the engine part of the digital photocopier is a process control. Some process conditions in an electrophotography, such as charging potential, exposure level, toner density compensation quantity, development bias, transfer voltage, fixing temperature, fixing pressure, process speed etc., are adjusted so as to avoid degradation of a photoconductor, developer etc. by time. In this way, the toner density, image output etc. become constant throughout the whole life of an apparatus. Such an adjustment is called a process control.

FIG. 12 shows a flow chart schematically showing a toner density control, which is carried out by the engine part of the apparatus as a part of process control. This toner density control is carried out to determine a control value of a toner density sensor in reference to the value of a life counter or an environment sensor (Step S111, Step S112), which control value is used for ON/OFF control as to whether the toner is supplied. More specifically, if the toner density is low (Yes in the step S113), "ON" is selected and the toner supply is carried out (step S114), so that the toner density is kept constant.

FIG. 13 is a flow chart schematically showing an intermediate tone gamma correction by way of toner patch, which finds conditions to determine a control parameter value in the process control. In this intermediate tone gamma correction, a toner patch of an intermediate pattern (tone) having a fixed input value is formed on a photoconductor or on a transfer belt, and a scanning device such as an optical sensor detects an quantity of reflection light from the toner patch.

To be more specific, calibration of optical sensor is carried out in Step S121, and a charging potential, an quantity of light, and a development bias (and transfer voltage, if necessary) in creating a solid image are determined (step S122). In this manner, the density condition of the solid image is adjusted. Then, a toner patch of an intermediate tone having a fixed input value is formed on a photoconductor or on a transfer belt under a density between the density of the solid image and no-image state (step S123). Then the quantity of reflection light from the toner patch is detected by an optical scanner. Next, the output value of the optical sensor is compared with a reference target value in Step S125, so as to find a correction quantity. Then, in Step S126, the existing intermediate gamma correction table is modified according to the correction quantity. In this way the intermediate gamma characteristic is kept constant.

The following more specifically explains the details of calculation of the foregoing toner consumption quantity. Note that, the following processing is performed for each of Cyan, Magenta, Yellow, and Black (for each of the CMYK input signals).

The pixel counting section 170 carries out a pixel counting operation (described later) with respect to a multi-valued image expressed by an input image signal. As shown in FIG. 10, the pixel counting section 170 includes counting means 171, weighting calculation means 172, a weighting coefficient table 173 and accumulating means 174.

The counting means 171 counts the gradation data of a multi-valued image (for example, a multi-gradation image of 16 or 256 gradation levels) for each pixel. More specifically, the counting means 171 counts an input signal value (gradation value, e.g. an input signal value of 0-15 levels (16 gradation levels)) for each of the pixels constituting a multi-valued image.

As the counting means 171 counts the gradation data of each pixel, the weighting calculation means 172 weights the pixel. More specifically, the weighting calculation means 172 first finds a weighting coefficient corresponding to the signal input value of the target pixel from the weighting coefficient table 173, and multiplies the signal input value by the coefficient to figure out a pixel count value. The weighting coefficient table 173 stores plural weighting coefficients for respectively corresponding to plural signal input values. In this manner, with the counting means 171, the weighting calculation means 172 and the weighting coefficient table 173, the pixel counting section 170 calculates a pixel count value for each pixel.

Further, the accumulating means 174 accumulates the all pixel count values which have been separately found. More specifically, after the weighting calculation means 172 figures out the pixel count values by multiplying each signal input value by the corresponding weighting coefficient, the accumulating means 174 accumulates the all pixel count values which correspond to the entire pixels of the all input multi-valued images. Then, based on the gross of the pixel count values found by the pixel count section 170, the total toner consumption quantity calculation means 180 figures out a total toner consumption quantity with respect to the all images having been outputted.

TABLE 1

| | GRADATION VALUE | WEIGHTING COEFFICIENT |
|---|---|---|
| AREA 1 | 0-4 | 0 |
| AREA 2 | 5-8 | 1 |
| AREA 3 | 9-12 | 3 |
| AREA 4 | 13-15 | 4 |

In Table 1, the sixteen signal input values which differ in toner consumption are classified into four areas (areas 1 to 4), which are respectively allotted with predetermined weighting coefficients. In the calculating of the pixel count value, one of the weighting coefficients corresponding to the four areas are allotted to each of the signal input values having the values 1-15, so that the signal input values are weighted. According to table 1, the signal input values of 0-4 gradation levels are weighted by a coefficient of 0, the signal input values of 5-8 gradation levels are weighted by a coefficient of 1, signal input values of 9-12 gradation levels are weighted by a coefficient of 3, and signal input values of 13-15 gradation levels are weighted by a coefficient of 4.

FIG. 14 shows correspondence between the signal input values and the weighting coefficients of 4 areas (four divisional areas) in the weighting coefficient table. As shown in FIG. 14, the gross area of the rectangle parts of each area is substantially equal to the area formed by the curved line which shows a toner consumption characteristic. According to this, the toner consumption quantity may be estimated by the gross of the weighted pixel count values.

There are many conventional techniques for calculating the toner consumption quantity, as disclosed in Japanese Laid-Open Patent Application Tokukai 2004-163553 (published on Jun. 10, 2004), Japanese Laid-Open Patent Application Tokukaihei 10-333419 (published on Dec. 18, 1998), Japanese Laid-Open Patent Application Tokukaihei 10-239979 (published on Sep. 11, 1998), Japanese Laid-Open Patent Application Tokukai 2001-296706 (published on Oct. 26, 2001), and Japanese Laid-Open Patent Application Tokukai 2004-309533 (published on Nov. 4, 2004). Also, the applicants of the present invention previously made an invention relative to the present invention, which is disclosed in Japanese Laid-Open Patent Application Tokukai 2006-023392 (published on Jan. 26, 2006: corresponding to US Patent Application No 2006007509 (A1)).

These conventional electrophotographic apparatuses such as digital photocopier, however, have the following drawback.

As described, when the toner consumption quantity of an output image is estimated through pixel counting, the gradation values have been weighted in accordance with a weighting coefficient table having predetermined fixed weighting coefficients. However, as shown in FIG. 14, weighting with such a weighting coefficient table may raise a significant difference between the value of weighting coefficient allotted to the signal input value from the weighting coefficient table and the value on the curved line which shows a toner consumption quantity characteristic of the signal input value. This typically happens to the weighting coefficients corresponding to the signal input values 4, 5, 8, 9 and 12. This problem decreases accuracy of estimation of toner consumption quantity based on the gross of the pixel count values.

Such a problem may be solved by using a weighting coefficient table having the same number of coefficients as the number of the gradation values of the input signals, that is, the table has the coefficients individually corresponding to the signal input values. The weighting coefficients in this case are shown in FIG. 15. With this table, the actual toner consumption quantity characteristic and the toner consumption quantity estimated based on the pixel counting come closer. In FIG. 15, the weighting coefficients are determined according to the toner consumption quantity characteristic expressed by a curved line D, but the characteristic may form the curved line D or the curved line E, depending on the apparatus type or the lives.

However, the weighting coefficients are each determined as a corresponding value to the signal input value of the pixel concerned, and therefore they are determined with no account of the input signal values of the peripheral pixels. Even with the same quantity of signal input value (gradation data) of the pixel, an electrostatic latent image on a photoconductive drum is developed differently depending on the signal input values of the peripheral pixels. For example, when a pixel is irradiated with a light beam from an exposure device under a certain condition determined for the gradation value, the quality of the electrostatic latent image varies depending on the exposure condition of the peripheral pixels. Further, this variation also causes variation in quantity of toner adhesion to the electrostatic latent image. This indicates the fact that the toner consumption quantity of a pixel is under influence of the signal input values of the peripheral pixels.

This conventional drawback results in inaccuracy of estimation of toner consumption quantity. Therefore there has been some error between the estimation result and the actual toner consumption quantity.

SUMMARY OF THE INVENTION

The present invention is made in view of the foregoing problems, and an object is to provide an image forming apparatus capable of accurate estimation of toner consumption quantity.

An image forming apparatus according to the present invention is an image forming apparatus for carrying out image forming in an electrophotography mode by processing a multi-valued image. The image forming apparatus comprises a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity; a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data; a total toner quantity equivalent value calculation section for determining a total toner quantity equivalent value by accumulating the toner quantity equivalent values of the all pixels of the multi-valued image calculated by the toner quantity equivalent value calculation section; and a control section for setting conditions for process control when the total toner quantity equivalent value reaches a predetermined value.

This invention is made in consideration of the fact that the toner consumption quantity of a pixel is under influence of not only its own gradation data but also gradation data of the periphery pixels. The small domain generation section generates, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains. The toner quantity equivalent value calculation section converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation. The toner quantity equivalent value calculation section further determines toner quantity equivalent values of all pixels of the multi-valued image based on the toner quantity equivalent value converted from the gradation data. The total toner quantity equivalent value calculation section determines a total toner quantity equivalent value by accumulating every toner quantity equivalent value calculated by the toner quantity equivalent value calculation section.

On this account, the present invention achieves an image forming apparatus capable of accurate estimation of toner consumption quantity.

The image forming apparatus also includes a control section for setting conditions for process control when the total toner quantity equivalent value calculated by the total toner quantity equivalent value calculation section reaches a predetermined value.

In this manner, the conditions of process control may be set at a desired time where the toner residue quantity comes to a predetermined point.

An image forming apparatus according to the present invention is an image forming apparatus for carrying out image forming in an electrophotography mode by processing a multi-valued image. The image forming apparatus comprises a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity; a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data; a total toner quantity equivalent value calculation section for determining a total toner quantity equivalent value by accumulating the toner quantity equivalent values of the all pixels of the multi-valued image calculated by the toner quantity equivalent value calculation section; and a control section for notifying a user of toner residue quantity when the total toner quantity equivalent value reaches a predetermined value.

This invention is made in consideration of the fact that the toner consumption quantity of a pixel is under influence of not only its own gradation data but also gradation data of the periphery pixels. The small domain generation section generates, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains. The toner quantity equivalent value calculation section converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation. The toner quantity equivalent value calculation section further determines toner quantity equivalent values of all pixels of the multi-valued image based on the toner quantity equivalent value converted from the gradation data. The total toner quantity equivalent value calculation section determines a total toner quantity equivalent value by accumulating every toner quantity equivalent value calculated by the toner quantity equivalent value calculation section.

On this account, the present invention achieves an image forming apparatus capable of accurate estimation of toner consumption quantity.

The image forming apparatus also includes a control section for notifying a user of toner residue quantity when the total toner quantity equivalent value reaches a predetermined value. This allows the user to be notified of accurate toner residue quantity.

An image forming apparatus according to the present invention is an image forming apparatus for carrying out image forming in an electrophotography mode by processing a multi-valued image. The image forming apparatus comprises a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity; a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data; a total toner quantity equivalent value calculation section for determining a total toner quantity equivalent value by accumulating the toner quantity equivalent values of the all pixels of the multi-valued image calculated by the toner quantity equivalent value calculation section, the toner quantity equivalent value calculation section storing a plurality kinds of said correlation between the gradation data of said at least one other pixel of the small domain and an actual toner consumption of the pixel subjected to toner quantity equivalent value calculation, and selects one kind according to usage circumstances.

This invention is made in consideration of the fact that the toner consumption quantity of a pixel is under influence of not only its own gradation data but also gradation data of the periphery pixels. The small domain generation section generates, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains. The toner quantity equivalent value calculation section converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation. The toner quantity equivalent value calculation section further determines toner quantity equivalent values of all pixels of the multi-valued image based on the toner quantity equivalent value converted from the gradation data. The total toner quantity equivalent value calculation section determines a total toner quantity equivalent value by accumulating every toner quantity equivalent value calculated by the toner quantity equivalent value calculation section.

On this account, the present invention achieves an image forming apparatus capable of accurate estimation of toner consumption quantity.

Further, the toner quantity equivalent value calculation section stores a plurality kinds of said correlation between the gradation data of said at least one other pixel of the small domain and an actual toner consumption of the pixel subjected to toner quantity equivalent value calculation, and selects one kind according to usage circumstances.

With this arrangement the toner quantity equivalent value counting section carries out toner quantity equivalent value calculation according to the circumstances, thereby more accurately estimating toner consumption quantity.

Additional objects, features, and strengths of the present invention will be made clear by the description below. Further, the advantages of the present invention will be evident from the following explanation in reference to the drawings.

DESCRIPTION OF THE EMBODIMENTS

The following explains one embodiment of the present invention with reference to FIGS. 1 through 9.

Figure 1:
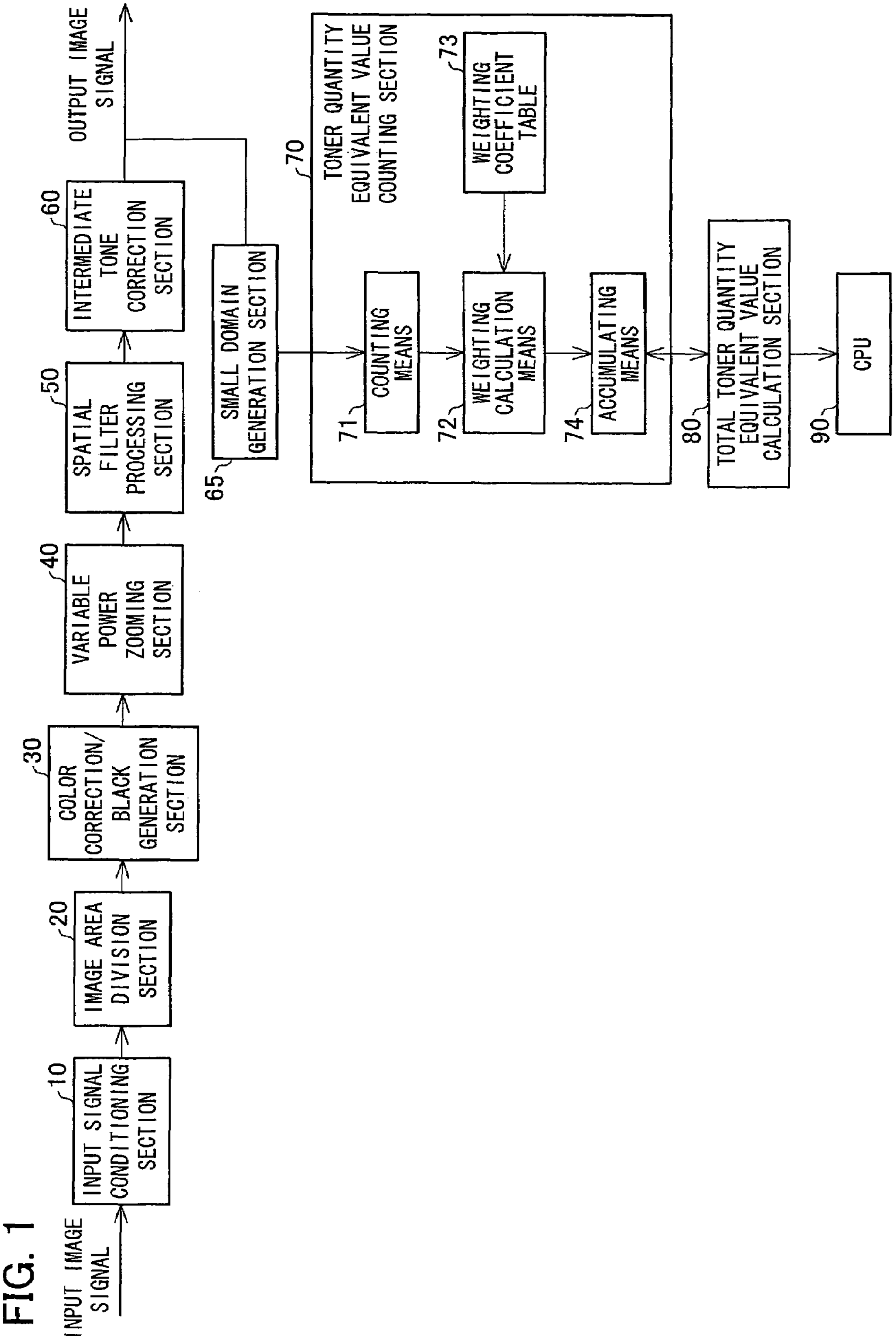
FIG. 1 is a block diagram showing an arrangement of a functional block in a digital electrophotographic apparatus according to one embodiment of the present invention. The functional block carries out image processing and toner quantity equivalent counting calculation.

FIG. 1 is a block diagram showing an arrangement of a functional block in a digital electrophotographic apparatus according to the present embodiment. This functional block carries out image processing and also calculates toner quantity equivalent value. As shown in FIG. 1, the functional block includes the input signal conditioning section 10, an image area division section 20, a color correction/black generation section 30, a variable power zoom section 40, a spatial filter processing section 50, an intermediate tone correction section 60, a small domain generation section 65, a toner quantity equivalent value counting section 70, and a total toner quantity equivalent value calculation section 80. The input signal conditioning section 10, the image area division section 20, the color correction/black generation section 30, the variable power zoom section 40, the spatial filter processing section 50, and the intermediate tone correction section 60 constitute an image processing device through which a digital input image signal is scanned by a scanner or the like, and is outputted as an output image signal. The small domain generation section 65, the toner quantity equivalent value counting section 70, and the total toner quantity equivalent value calculation section 80 serve to calculate the total toner quantity equivalent value since the toner cartridge is mounted to the apparatus, based the an output image signal of the image processing device.

The functional block is mainly constituted of a circuit using a DSP (Digital Signal Processor). The program for DSP, reference data etc. are stored in a ROM or a non-volatile memory. In the DSP, a part of a series of signal processing steps is carried out by software operation, and the rest is carried out by a hardware circuit. Further, a CPU may perform auxiliary operation, and a dedicated IC, LSI etc. may be used in some cases.

In the functional block, the result of toner equivalent calculation by the total toner quantity equivalent value calculation section 80 is used for judgment as to whether or not the condition setting for the process control is necessary. The condition setting for the process control, or the actual calculation and control in the process control is carried out, for example, by CPU or a program of the CPU, the ROM or the nonvolatile memory storing the reference data, or the dedicated IC or LSI. In the structure of FIG. 1, an output signal from the total toner quantity equivalent value calculation section 80 is received by the CPU (control section) 90. The CPU 90 administrates the control operations in the process control.

The following explains a function of each section of the foregoing functional block.

The input signal conditioning section 10 receives the digital input image signal scanned by a scanner or the like (not shown), and subjects the signal to various processings such as pre-processing for the subsequent image processing, gamma correction for image adjustment, various conversions etc. This digital input image signal is a multi-valued image signal.

The image signal is next supplied to the image area division section 20 which classifies the image data by the type of image, and attaches to the signal an identification signal (area identification signal) which indicates the area type. Text area and dot picture are typical examples of the image area. The area identification signal is used to enable separate processings for the respective areas in the spatial filter processing section 50 at a later stage, for example, smooth filtering for a dot area, and edge enhancement filtering for a text area. The area identification signal is also used in conversion of gamma characteristic of intermediate tone into another characteristic with more intense density difference, in the intermediate tone correction section 60 at the next stage.

The color correction/black generation section 30 carries out color correction/black generation of a signal. With this processing, an RGB image signal transmitted from the image area division section 30 is converted into a CMYK (cyan, magenta, yellow, black) image signal, which is a final state of signal, and now is ready to be outputted.

The CMYK image signal generated in the color correction/black generation section 30 is subjected to variable power zoom process in the variable power zoom section 40.

The resulting CMYK image signal is then supplied to the spatial filter processing section 50 where the CMYK signal is subjected to spatial filtering, that is, an appropriate spatial filtering selected from a spatial filter table according to the area identification signal or setting of image mode. The intermediate tone correction section 60 corrects an intermediate tone gamma characteristic of the image signal having been through the spatial filtering. Finally image signal having been through the intermediate tone gamma characteristic correction is outputted as an output image signal, and also is supplied to the small domain generation section 65.

The small domain generation section (small domain generating means) 65 classifies the respective CMYK signal of the output image signal supplied from the intermediate tone correction section 60 into a predetermined small domains. The signal input values of the pixels in each small domain all contribute to the toner quantity equivalent value calculation for the area.

As described, one of the conventional problems is that the signal input values of the peripheral signals affects the toner consumption quantity of each pixel. In view of this problem, in contrast to the estimation of the toner consumption quantity only in consideration of the signal input value of each pixel, the present embodiment carries out the estimation by using a weighting coefficient which is determined according to a plurality of signal input values of the pixels in the small domain.

In classifying the signals into the small domains, the small domain generation section 65 classifies the all pixels constituting the image into pixel groups each constituted of a 3×3 matrix or a 4×4 matrix. The small domain of such a pixel group may have any shape as long as it is a continuous single section. The small domain may be formed for every single pixel so that all pixels serve as target pixels. Otherwise, the small domain may be formed so that each pixel is included in only one of the domains (i.e., the domains are not overlapped). In either case, the small domain generation section 65 classifies the pixels of the input image signal so that each pixel is included in one of the small domains, i.e., all pixels are subjected to the toner quantity equivalent value calculation.

Figures 2, 3:
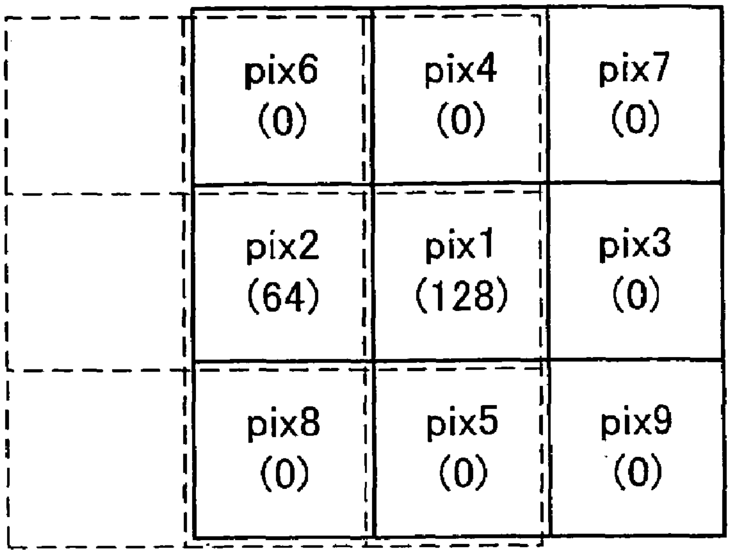
FIG. 2 is a drawing showing an example of a small domain.
FIG. 3 is a drawing showing another example of a small domain.

FIG. 2 shows an example of small domains. These small domains are each constituted of 3×3 matrix, and each pixel becomes a target pixel (i.e., each pixel becomes a "pixel for the toner quantity equivalent value calculation") in one of the domains. In this example of small domain (solid line), the pixel "pix1" in the center is a target pixel. As shown in the figure, in the case of a signal input value expressed by 256 gradation levels, the signal input value of the pixel "pix1" is 128, the value of the pixel "pix2" on the left is 64, and the values of the rest of the pixels are all 0. When the pixel "pix2" becomes a target pixel, another small domain is generated as denoted by the broken line. In this manner, the small domains are overlapped with each other, and signal input value of each signal is used plural times in the calculations of different small domains. In the small domain in which the target pixel resides in the edge of the image, some dummy signal input values are used as the values of the adjacent pixels.

FIG. 3 shows an example of small domains. These small domains are each constituted of 3×3 matrix, and each pixel belongs only to a single domain (i.e., the domains are not overlapped). In this case, all of the pixels in the small domain are subjected to the toner quantity equivalent value calculation.

Note that, to ensure appropriate influence of periphery pixels, the small domain is preferably not too large, specifically no more than 6×6 matrix. Any arbitrary shape may be used for the small domain within a 6×6 matrix. An excessive size of small domain results in a decrease in accuracy of the toner quantity equivalent value calculation.

After the pixels are classified into the small domains by the small domain generation section 65, the signal input values are supplied to the toner quantity equivalent value counting section 70 together with the information of the classification into the small domains. With the information of classification, it is not necessary to create the signal input value of the same pixel again even in the case where the pixels are used form a plurality of small domains.

The toner quantity equivalent value counting section (toner quantity equivalent value counting means) 70 includes counting means 71, weighting calculation means 72, a weighting coefficient table 73 and accumulating means 74.

The counting means 71 carries out counting of a multi-valued image (for example, a multi-gradation image of 16 or 256 gradation levels) for each pixel in each of the small domains. More specifically, the counting means 71 counts an input signal value (gradation value, e.g. an input signal value of 0-255 levels (256 gradation levels) for each of the pixels in the respective small domains.

The weighting calculation means 72 first carries out calculation for correcting the counting values of the respective small domains given by the counting means 71. The weighting calculation means 72 first corrects the counting values in consideration of the influence of the periphery pixels, and then weights the resulting values so as to find the toner quantity equivalent values. More specifically, the weighting calculation means 72 finds a weighting coefficient corresponding to the small domain of the target pixel from the weighting coefficient table 73, and multiplies the corrected signal input value by the coefficient to figure out the toner quantity equivalent value. The weighting coefficient table 73 stores plural weighting coefficients for respectively corresponding to plural signal input values. In this manner, with the counting means 71, the weighting calculation means 72 and the weighting coefficient table 73, the pixel counting section 70 calculates a toner quantity equivalent value for each small domain.

Here, the correction of the signal input value in each small domain performed by the weighting calculation means 72 may be carried out in several ways. However, in any of the cases, the correction calculation is carried out with respect to the signal input values of the pixels of each small domain by assuming an actual development result of the electrostatic latent image, in other words, by finding a signal input value of a similar state to the actual development result under the influence of the periphery pixels.

For example, when the small domain have the structure of FIG. 2, the weighting calculation means 72 finds the gross value of the signal input values of the all pixel in the small domain, and the signal input value of each target pixel is corrected based on this gross value through a predetermined certain way of calculation. According to this method, in FIG. 2, the gross value of signal input values of the all pixel of the small domain is: 128+64=192. That is, the signal input value (128) of the pixel "pix1" is corrected by the predetermined calculation based on this value. When the toner is charged to a negative polarity in which a larger signal input value means a higher density, the actual development state of any given pixel becomes closer to that of a smaller signal value with an increase of the signal input values of the periphery pixels. Therefore, in this correction calculation, the degree of reduction of the signal input value of each pixel increases as the gross of the signal input values in the small domain increases.

As another correction method, in FIG. 2, the average of the weighting coefficients for the signal input values is found in each small domain. In this case, the signal input value of each pixel of the small domain is multiplied with a predetermined "weighting coefficient for signal value correction", and signal input value is modified by dividing the multiplication result by the gross of the weighting coefficients. For example, in FIG. 2, the weighting coefficients for signal value corrections are set as follows: 1 with respect to "pix1", ¼ with respect to "pix2"-"pix5", 0 with respect to "pix6"-"pix9". According to this, the signal input value of "pix1" is found as $\{128\times1+(64+0+0+0)\times¼+(0+0+0+0)\times0\}/\{1+(¼)\times4+0+4\}=72$. That is, the signal input value 128 is modified into 72.

As with the first example, the actual development state of any given target pixel becomes closer to that of a smaller signal value with an increase of the signal input values of the periphery pixels. However, in this correction calculation using the "weighting coefficients for signal value correction", the degree of the influence of the signal input values of the periphery pixels is also taken into account. On the whole, the degree of reduction of the signal input value increases when many of the peripheral pixels have large signal input values in the small domain. Note that, when the "weighting coefficient for signal input value correction" is 0 as with the case above, it simply means no adoption of signal input value. In this case, the correction calculation is performed by using a plurality of pixels including the "pixel subjected to toner quantity equivalent value calculation" in the small domain. For example, in the case above, the correction calculation is performed by using the target pixel (pix1) and the four adjacent (horizontally and vertically adjacent) pixels pix2 through pix5.

Further, when the small domain is constituted in the manner of FIG. 3, the gross of the signal input values in the small domain is first found, and the signal input value for each pixel is corrected by a predetermined certain way of calculation based on the gross value. This is the same as the correction calculation by finding the gross of signal input values performed in the structure of FIG. 2.

Both in FIGS. 2 and 3, the calculation for modifying the signal input value of the "pixel subjected to toner quantity equivalent value calculation" into the "toner quantity equivalent value" is performed by using the signal input value of the "pixel subjected to toner quantity equivalent value calculation" and a signal input value of one or more other pixels in the small domain to which the "pixel subjected to toner quantity equivalent value calculation" belongs.

The weighting calculation means 72 reads out one of the "weighting coefficients for toner quantity equivalent value calculation" from the weighting coefficient table 73 based on the signal input value thus modified. A signal input value of a certain gradation level is not proportional to a toner consumption quantity for the same gradation level, and therefore the "weighting coefficients for toner quantity equivalent value calculation" are stored in the weighting coefficient table 73. The weighting coefficients stored in the weighting coefficient table 73 respectively correspond to different signal values. The multiplication (weighting) results are stored in the accumulation section 74. Note that, in the arrangements shown in FIGS. 2 and 3 in which the signal input values are modified by finding the gross of the signal input values of all pixels in each small domain, the weighting coefficient table 73 may store the information of resulting correction value calculated from the gross of the signal input values, which is attached to each of the "weighting coefficients for toner quantity equivalent value calculation". In this case, the correction of signal input value and the toner quantity equivalent value calculation are performed at the same time by reading out such a weighting coefficient including a correction result.

Such a calculation of toner quantity equivalent values of the respective pixels, which is performed through the correction of the signal input value and the toner quantity equivalent value calculation by the weighting calculation means 72, is equivalent to the following operation by the toner quantity equivalent value counting section 70. That is, the toner quantity equivalent value counting section 70 previously stores the correspondence between the gradation data of the pixels of the small domain and the toner consumption of the "pixel subjected to toner quantity equivalent value calculation" together with the result of the correction calculation of the signal input value. The toner quantity equivalent value counting section 70 then converts the gradation data of the "pixel subjected to toner quantity equivalent value calculation" into the toner quantity equivalent value, based on the correspondence.

The accumulating means 74 accumulates the all signal input values of the input multi-valued pixels which have been separately multiplied with the "weighting coefficients for toner quantity equivalent value calculation" by the weighting calculation means 72. The accumulation result indicates a toner quantity equivalent value of the entire output image. The accumulation result is supplied to the total toner quantity equivalent value calculation section 80.

As the toner quantity equivalent values of the whole pixel of the multi-valued images are thus sequentially figured out, the total toner quantity equivalent value calculation section (total toner quantity equivalent value calculating means) 80 adds up each quantity. With this function, if the addition of all of the accumulation results found by the accumulation section 74 is started at the time where a new toner cartridge is attached to a digital electrophotographic apparatus, it is possible to find out the total toner quantity equivalent value for a certain toner cartridge.

This makes it possible to realize an image forming apparatus capable of accurate estimation of toner consumption quantity.

A digital electrophotographic apparatus has a function of changing the conditions of process control when the total toner quantity equivalent value reaches a threshold. The total toner quantity equivalent value calculation section 80 supplies a signal, which indicates that the total toner quantity equivalent value reaches the threshold, to the CPU 90. Receiving the signal the CPU 90 carries out control for renewing the conditions of process control. In this manner, the conditions of process control may be set at a desired time where the toner residue quantity comes to a predetermined point.

Figure 4:
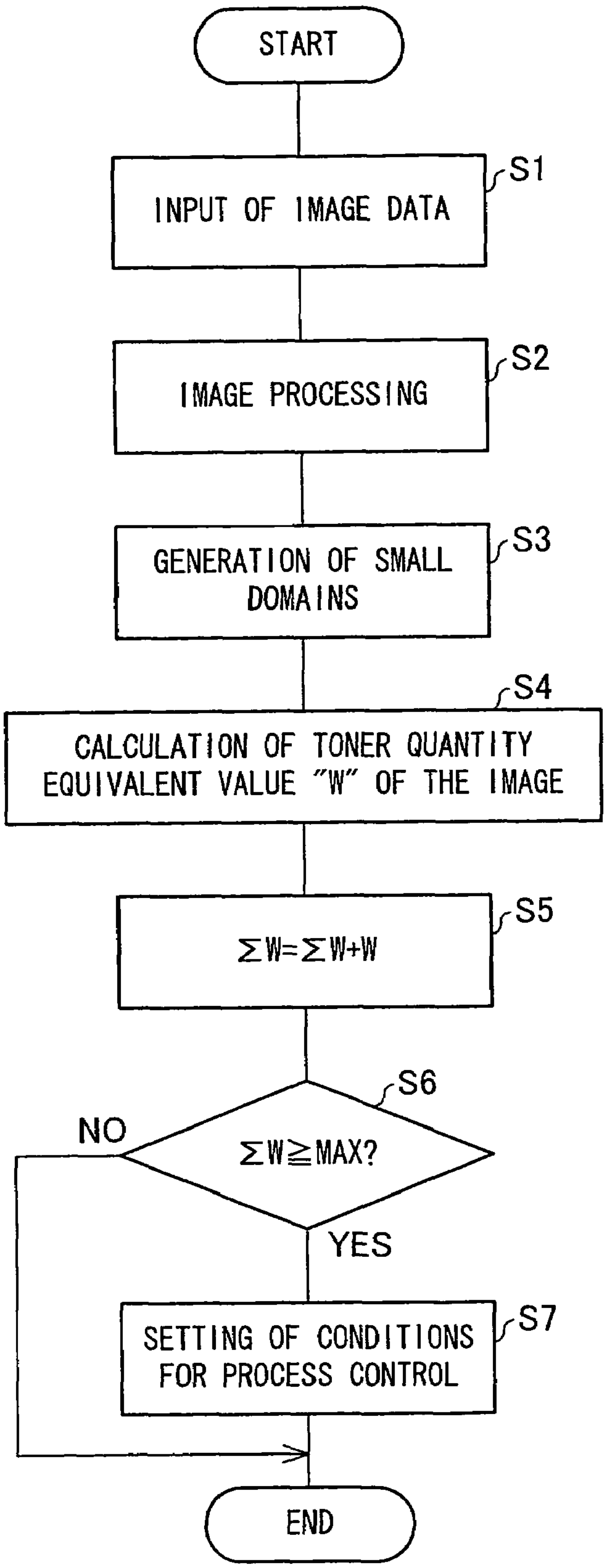
FIG. 4 is a flow chart showing a process carried out by the functional block shown in FIG. 1.

FIG. 4 is a flow chart showing a process of judgment as to whether or not to set the conditions of process control. The judgment is performed through calculation of the total toner quantity equivalent value.

An image data is first supplied to the digital electrophotographic apparatus in Step S1, and the image is then processed by an image processing device in Step S2. In Step S3, an output signal of the image processing device is supplied to the small domain generation section 65, with which the small domain generation section 65 generates small domains. In Step S4, the small domain generation section 65 supplies an image signal and details of small domains to the toner quantity equivalent value counting section 70. Then the toner quantity equivalent value counting section 70 causes the counting means 71 to count the signal input values of the pixels. Next, the weighting calculation means 72 corrects a signal input value of the target pixel of each small domain (in the structure of FIG. 3) or the signal input values of the all pixels in the small domain (in the structure of FIG. 3). Then, the "weighting coefficients for toner quantity equivalent value calculation" are read out from the weighting coefficient table 73 based on the corrected signal input values, and the signal input values are separately multiplied with respective weighting coefficients. Then, the multiplication results for the whole pixel are accumulated by the accumulation section 74, so as to find a "toner quantity equivalent value W" for the whole input image.

In Step S5, the total toner quantity equivalent value calculation section 80 performs the following calculation. The toner quantity equivalent value W found in Step S4 is added to the latest total toner quantity equivalent value ΣW, so that the quantity ΣW is updated. Then, in Step S6, the total toner quantity equivalent value calculation section 80 carries out judgment as to whether or not the total toner quantity equivalent value ΣW reaches or exceeds a predetermined value MAX. If yes (the total toner quantity equivalent value ΣW reaches or exceeds the predetermined value MAX), a signal for setting conditions of process control is supplied to the CPU 90 (Step 7), so that the CPU starts setting the conditions. On the other hand, if the Step 6 found that the total toner quantity equivalent value ΣW falls below the predetermined value MAX, the calculation is finished.

Figure 8:
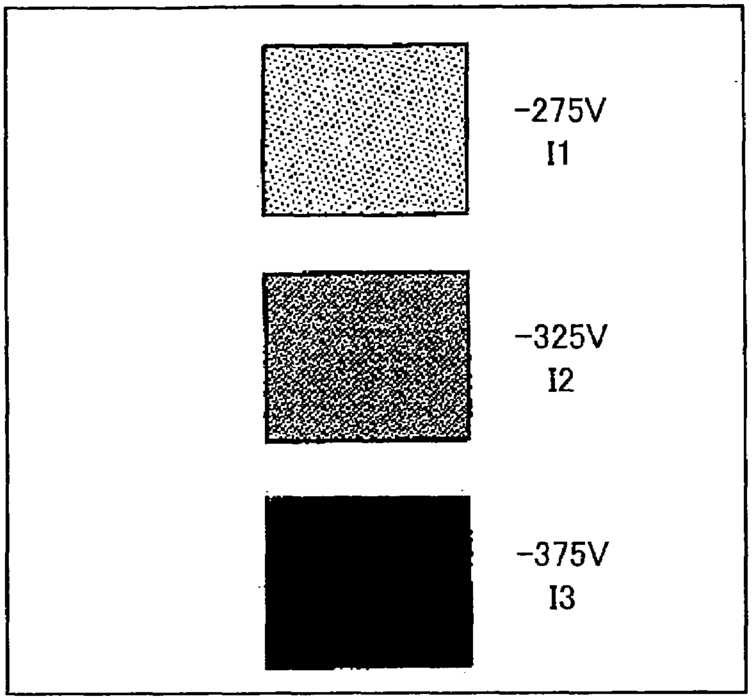
FIGS. 8(*a*) and 8(*b*) are drawings showing creation of a density detection patch, and determination of development bias with the patch.
Figure 8:
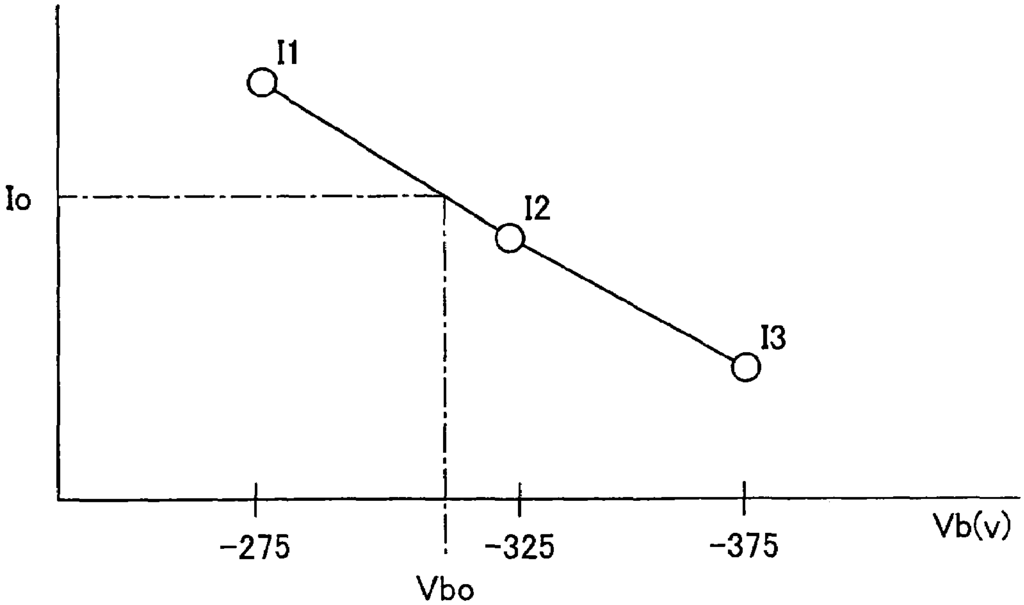
Figure 9:
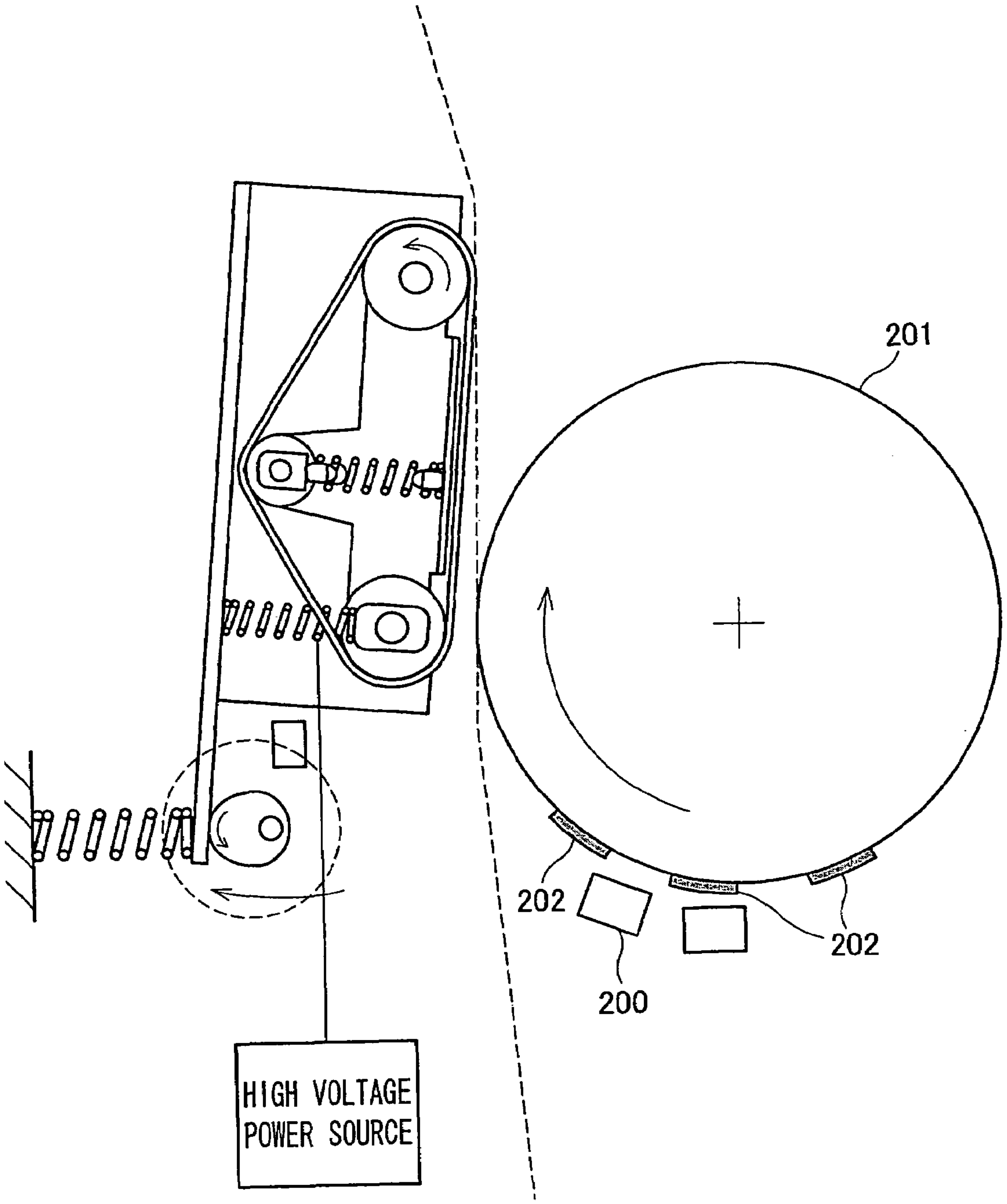
FIG. 9 is a cross-sectional view of an apparatus, showing a layout of a section for creating a density detection patch and a detection section.
Figure 10:
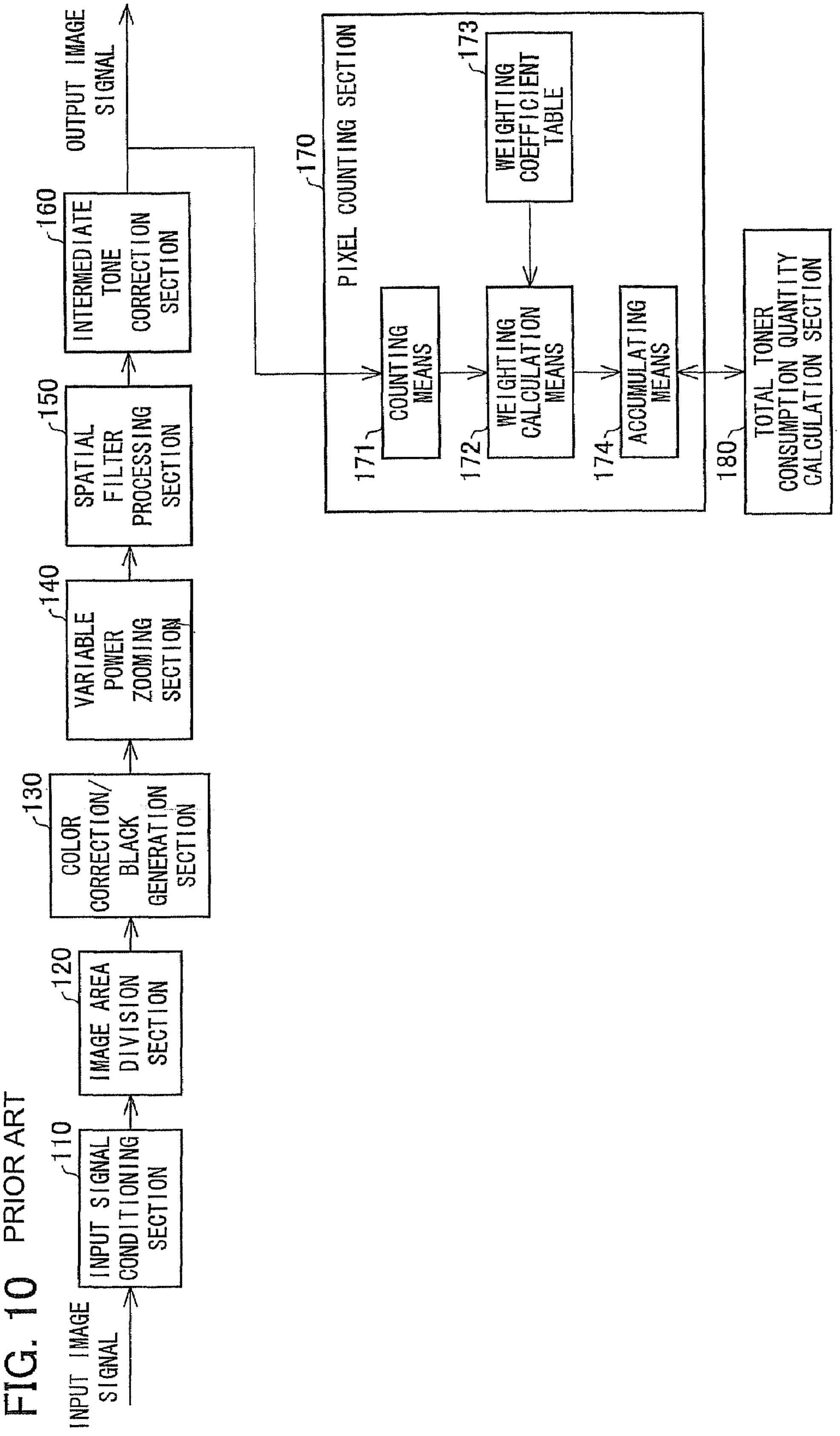
FIG. 10 PRIOR ART
FIG. 10 is a block diagram showing an arrangement of a functional block in a conventional digital electrophotographic apparatus. The functional block carries out image processing and toner consumption quantity calculation.
Figure 11:
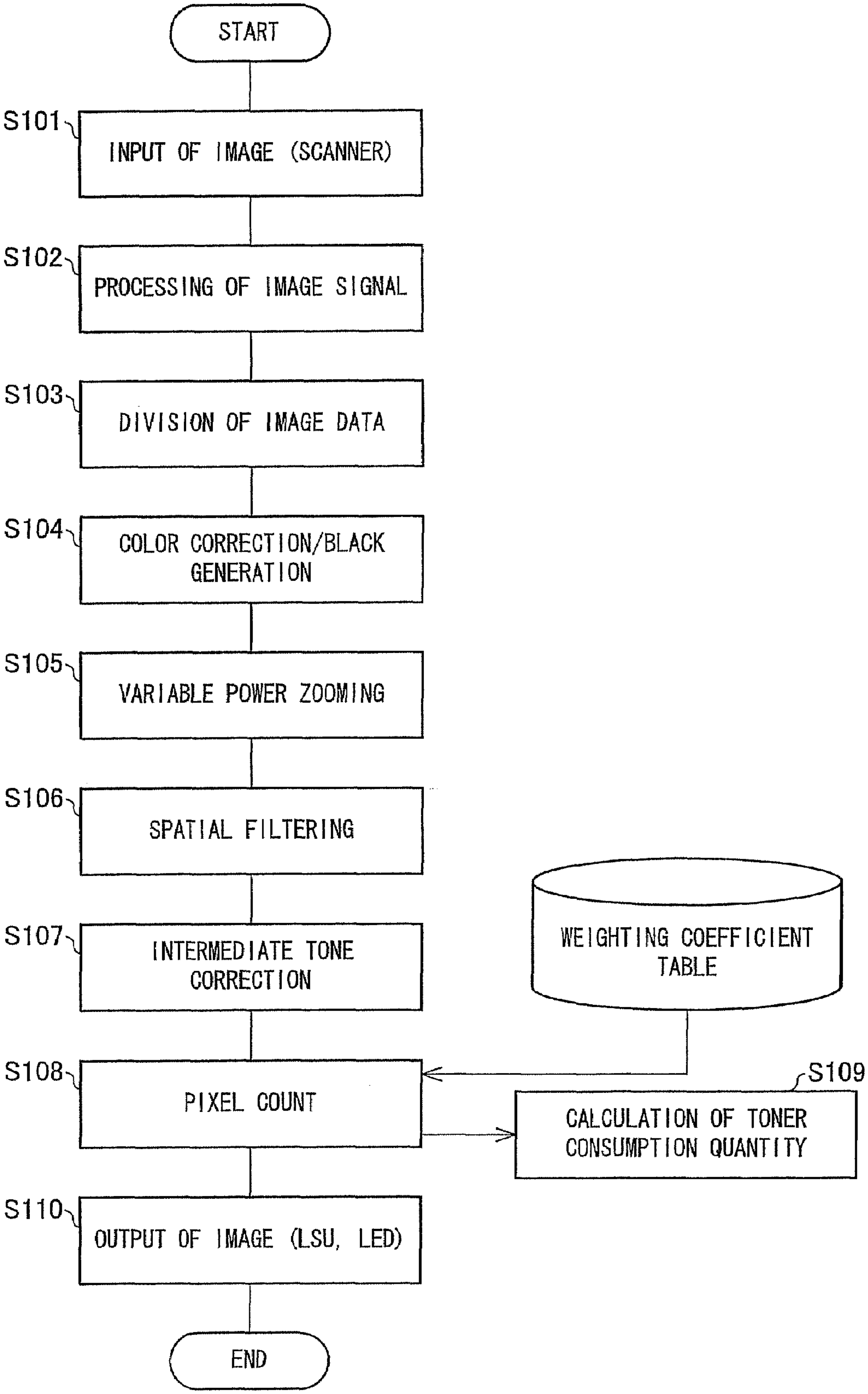
FIG. 11 PRIOR ART
FIG. 11 is a flow chart showing an image processing operation performed by a conventional image forming apparatus.
Figure 12:
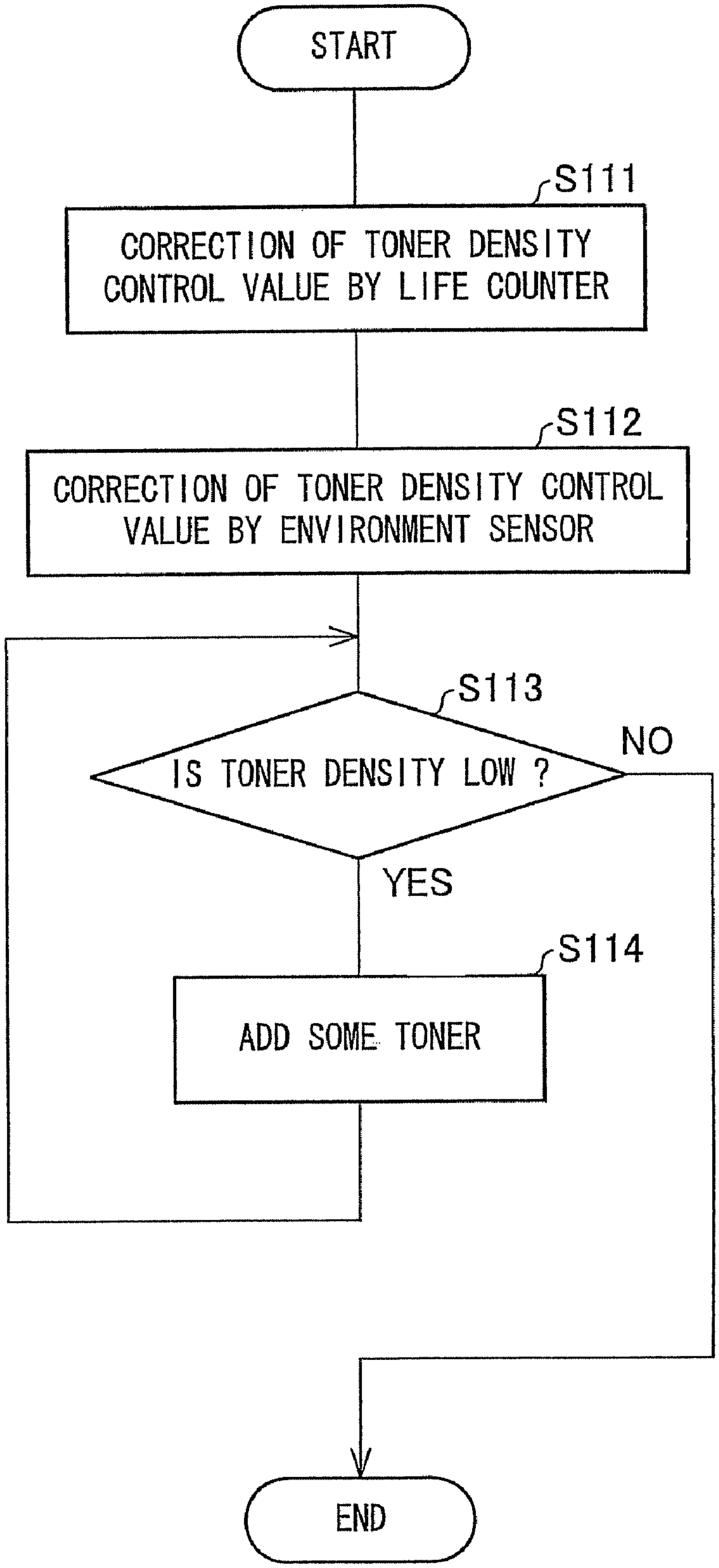
FIG. 12 PRIOR ART
FIG. 12 is a flow chart showing an operation of toner density control.

The following describes an example of the step for setting the conditions of process control. Under the condition of grid bias=−500V, laser power Po=0.43 mW, duty ratio of PWM of laser=100%, the development bias Vb is varied to −275V, −325V, and −375V, as shown in FIG. 8. As a result, three density detection patches (20 mm×20 mm) are formed on the surface of a photoconductive drum 201, as shown in FIG. 9.

In detection of these density detection patches 202, one of them is read out by a patch image detection device 200 constituted of a reflection-type optical sensor, and the selected patch is sampled to create another about dozen patches. Then, an average value is found excluding the vicinity of the minimum value and the vicinity of the maximum value. The output of the patch image detection device 200 is varied to I1, I2 and I3 corresponding to the respective densities of the three kinds of patches.

As shown in FIG. 8(*b*), a regression curve of development bias with respect to the density is found, which further figures out a development bias Vb0 at which the density becomes a predetermined level "Io". The predetermined density Io is a density obtained at a condition where the duty ratio of PWM of laser=80%. In other words, the development bias Vb0 is a level of development bias for allowing development of an image with a desired density by adjustment of light quantity in the exposure process. As the development bias Vb0 is figured out, the existing development bias is modified to Vb0.

In the examples above, the conditions of process control are set when the total toner quantity equivalent value reaches a predetermined value, but the following arrangement is also possible. When the total toner quantity equivalent value reaches a predetermined value, which is in this case determined as, for example, a "toner-near-end state", which is a level at which notification of the toner quantity calculation or the toner residue quantity to the user is considered necessary, such information is conveyed to the user by way of display of toner residue quantity, a warning of runout of toner, or the like. For example, in the case of FIG. 1, the total toner quantity equivalent value calculation section 80 sets a predetermined value according to the level of toner residue quantity at which the notification to the user is necessary. Then, when the total toner quantity equivalent value reaches this value, a signal for instructing the display of toner residue quantity or warning of runout of toner is outputted to the CPU 90. Receiving this signal, the CPU 90 controls the display section, the voice output device or the like of the digital electrophotographic apparatus, so that the toner residue quantity or the warning of runout of toner is conveyed to the user. With this function, the user is always notified of accurate information about the toner residue quantity.

Further, the weighting coefficient table 73 of FIG. 1 may be constituted of a plurality of tables each corresponding to a specific situation. In this case, one of the tables is selected in the operation according to the circumstances.

For example, as shown in Table 2, a table TBL 1 is used under a humidity of 30% or lower, a table 2 is used under a humidity of 30% to 50%, a table 3 is used under a humidity of 50% -70%, and table 4 is used under a humidity of 70% or greater.

TABLE 2

| HUMIDITY (%) | TABLE |
|---|---|
| Less than 30 | TBL 1 |
| 30-50 | TBL 2 |
| 50-70 | TBL 3 |
| More than 70 | TBL 4 |

Figure 5:
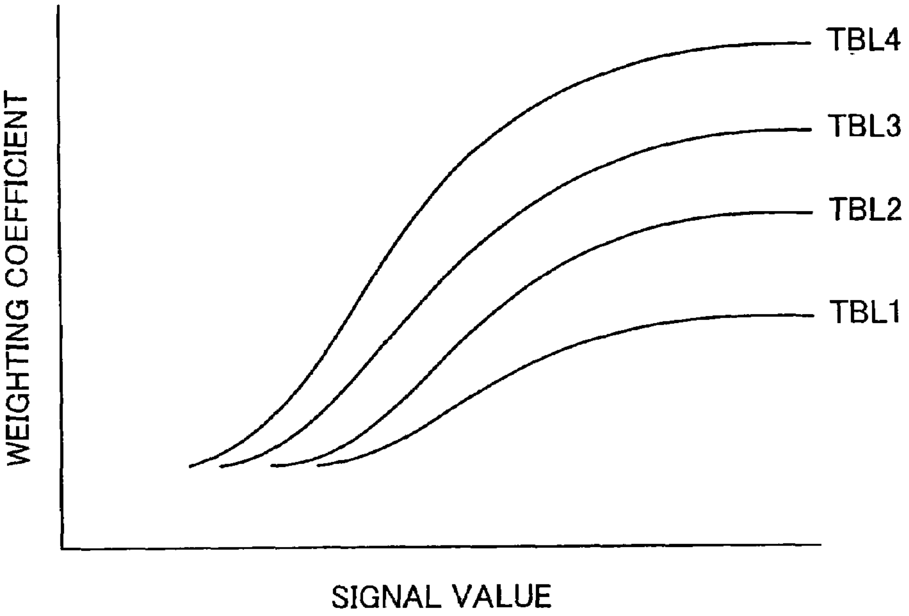
FIG. 5 is a graph showing differences between plural kinds of weighting coefficient tables.

FIG. 5 shows a relationship between (i) a signal value and (ii) a weighting coefficient for toner quantity equivalent value calculation. In the figure, the weighting coefficient with respect to signal value increases as the degree of humidity increases.

As described, the existence of the plurality of weighting coefficient tables 73 is equivalent to the fact that the toner quantity equivalent value counting section 70 stores in advance a plurality of relationship patterns between (i) the gradation data in the pixels of small domain and (ii) the toner consumption quantity of "the pixel subjected to toner quantity equivalent value calculation", together with the details of the correction calculation of the signal input values. With this arrangement the toner quantity equivalent value counting section 70 carries out toner quantity equivalent value calculation according to the circumstances, thereby more accurately estimating toner consumption quantity.

Further, in this digital electrophotographic apparatus, each of the weighting coefficient tables 73 may be arranged to be rewritable.

The following Table 3 shows an example of a rewritable weighting coefficient table 73. In this example, the signal input value has 16 gradations.

TABLE 3

WEIGHTING COEFFICIENT TABLE (VARIABLE)

| SIGNAL INPUT VALUE | WEIGHTING COEFFICIENT |
|---|---|
| 0 | X0 |
| 1 | X1 |
| 2 | X2 |
| 3 | X3 |
| 4 | X4 |
| 5 | X5 |
| 6 | X6 |
| 7 | X7 |
| 8 | X8 |
| 9 | X9 |
| 10 | X10 |
| 11 | X11 |
| 12 | X12 |
| 13 | X13 |
| 14 | X14 |
| 15 | X15 |

In Table 3, the weighting coefficients (X0-X15) corresponding to the signal input values 0-15 are variable. These weighting coefficients X0-X15 are modified by rewriting means (not shown), which is an optional component of the structure of FIG. 1, in the following manner.

Figure 7:
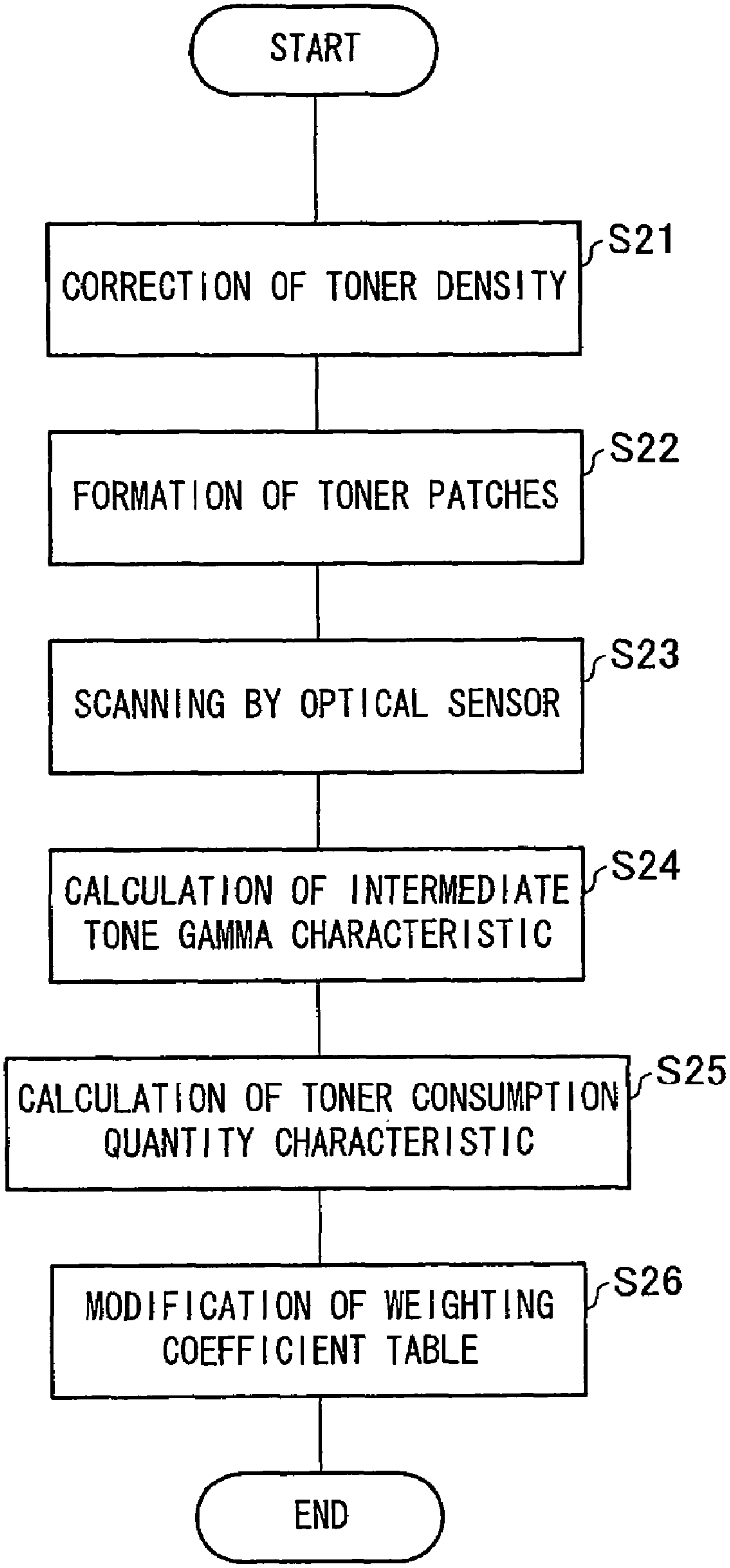
FIG. 7 is a flow chart showing a flow of modification of the weighting coefficient table.

FIG. 7 is a flow chart showing this rewriting process.

Figure 6:
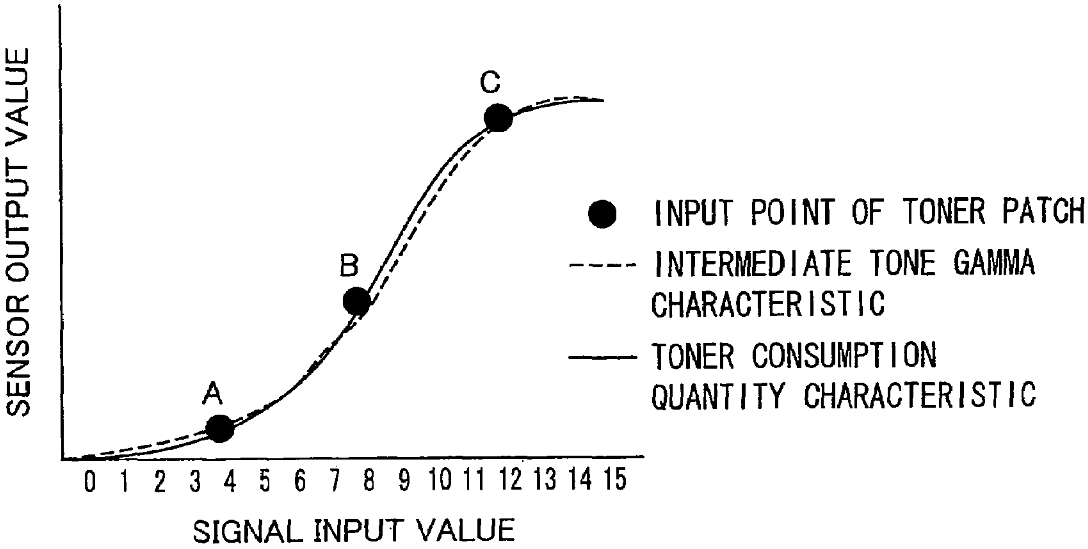
FIG. 6 is a drawing showing modification of the weighting coefficient table.
Figure 13:
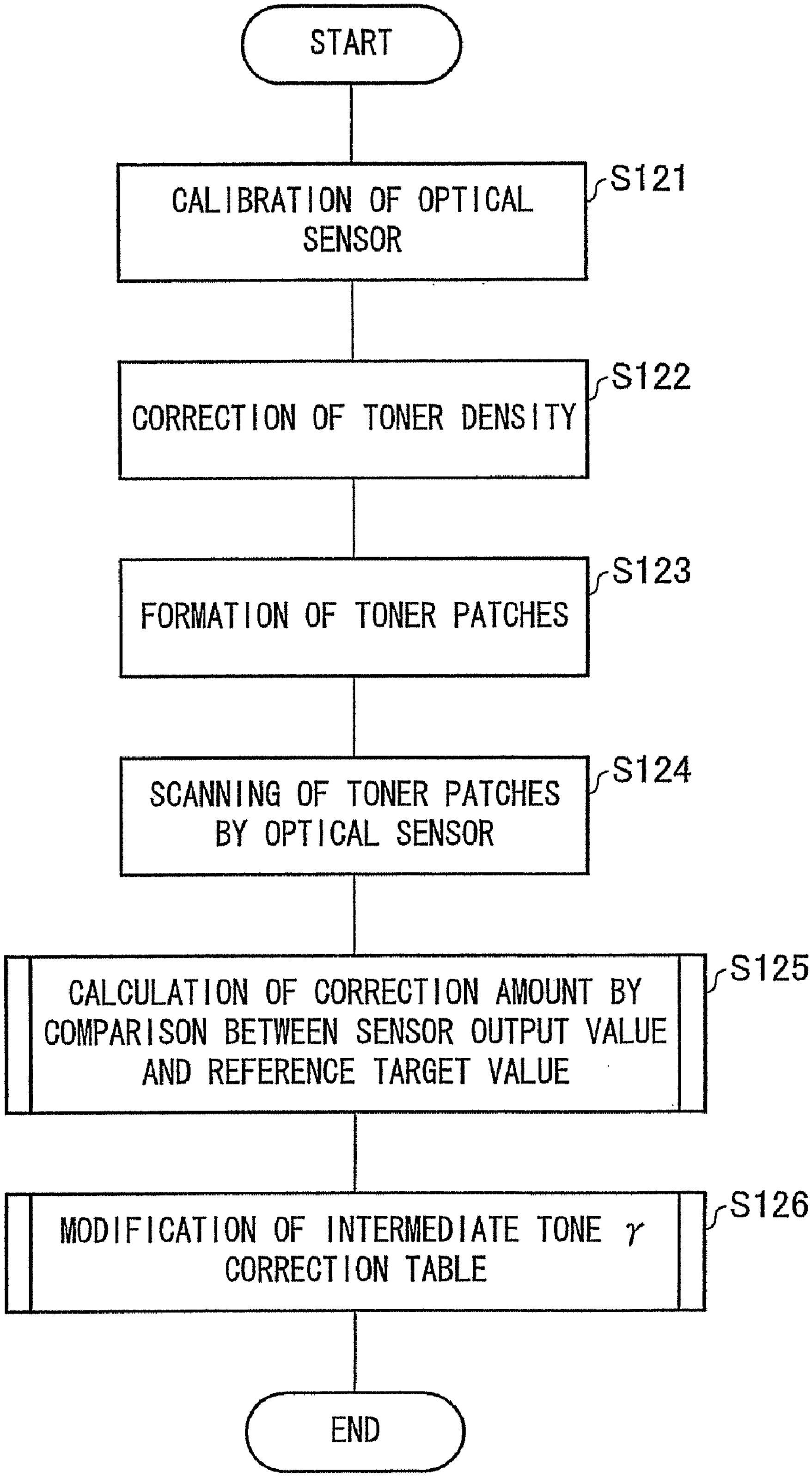
FIG. 13 PRIOR ART
FIG. 13 is a flow chart showing an operation of intermediate gamma correction with a toner patch.
Figure 14:
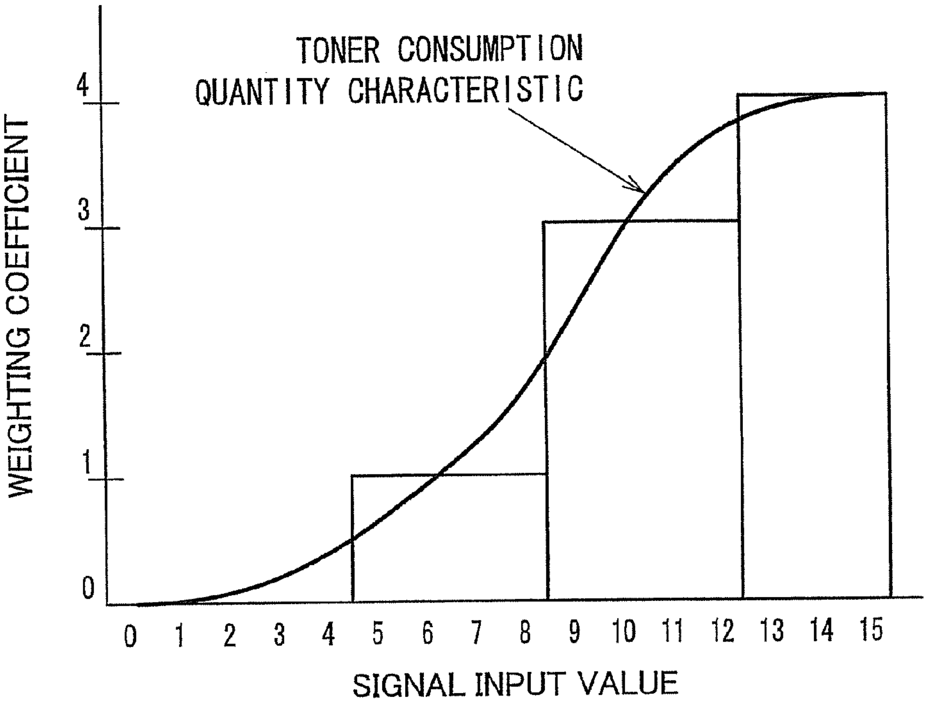
FIG. 14 PRIOR ART
FIG. 14 is a drawing showing a first relationship between a signal input value and a corresponding weighting coefficient in a conventional weighting table.
Figure 15:
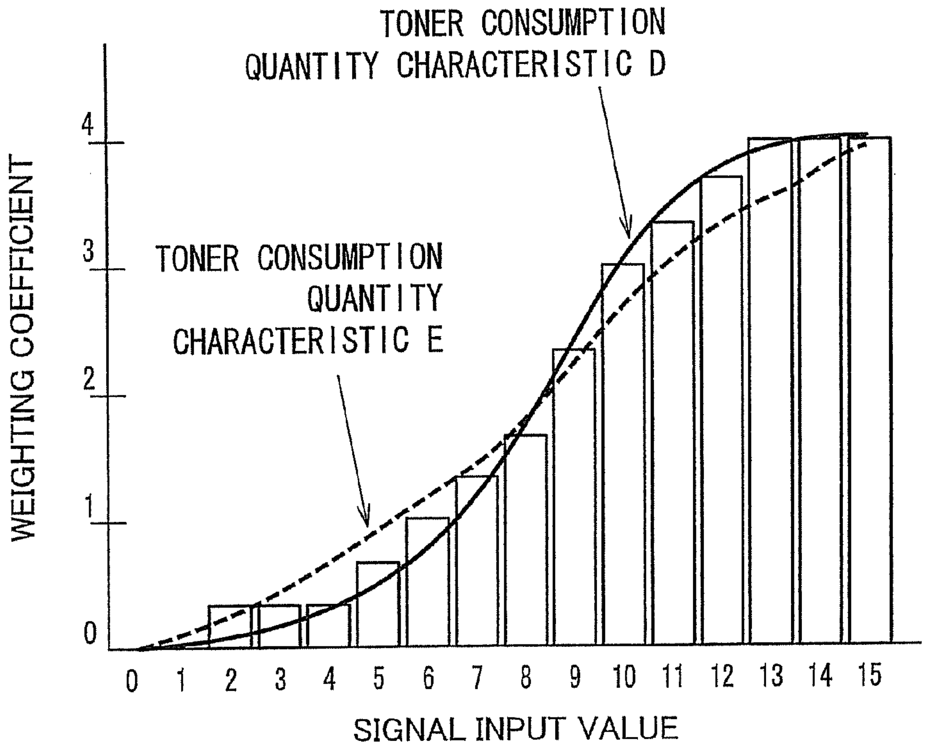
FIG. 15 PRIOR ART
FIG. 15 is a drawing showing a second relationship between a signal input value and a corresponding weighting coefficient in a conventional weighting table.

After the step (Step S21) of correcting the toner density, a plurality of toner patches different in tone are formed on a photoconductive body or on a transfer belt (Step S22), as shown by the points A through C in FIG. 6. More specifically, toner patches of two or more (the number is decided in advance) input points are formed on a photoconductive body or on a transfer belt. Then, the reflection light quantity of each toner patch is scanned by scanning means such as an optical sensor (Step S23). In FIG. 6, the vertical axis expresses sensor output of scanning means such as an optical sensor, and the horizontal axis expresses a signal input value (gradation data). The number of input points is not particularly limited, but preferably not less than three. Note that, Steps S21 through S23 are the same as Steps S122 through S124 (see FIG. 13) which are the steps for intermediate tone gamma correction described in the section of "BACKGROUND OF INVENTION". Therefore, the next step described below may use the results of the intermediate tone gamma correction.

Next, the intermediate tone gamma characteristic (shown by the broken line of FIG. 6) is calculated based on the sensor output of the toner patches formed with the plurality of input points (Step S24). With the resulting intermediate gamma characteristic, a toner quantity equivalent value for the signal input value is found as shown by the solid line of FIG. 6 (Step S25). In this manner, the weighting coefficients are determined based on the characteristics of the resulting toner quantity equivalent values, and the existing weighting coefficients in the weighting coefficient tables 73 are modified to the weighting coefficients thus determined (Step S26). For example, in the case of Table 3, the weighting coefficients X0-X15 respectively corresponding to the input signal values 0-15 are modified according to the characteristics of toner quantity equivalent values.

With such a process, the toner quantity equivalent value counting section 70 calculates toner quantity equivalent values of input multi-valued images using the weighting coefficients modified by the rewriting means.

With this method, even if the characteristic of toner quantity equivalent value varies depending on the type or lifespan of the apparatus, the weighting coefficient table 73 can be modified according to the changes. Therefore, the calculation of toner quantity equivalent value is carried out in the optimal way, and the toner consumption quantity can be accurately estimated regardless of the type or lifespan of the apparatus. In other words, because the calculation of toner consumption is performed based on the weighting coefficient table 73 modified by the rewriting means, the result will be very close to the actual toner consumption quantity (the error is very small).

Further, the respective functional blocks of the image forming apparatus according to the present embodiment, particularly the small domain generation section 65, the toner quantity equivalent value counting section 70, the total toner quantity equivalent value calculation section 80 and the CPU 90 are realized by software by using a processor such as DSP, CPU or the like.

Specifically, the image forming apparatus of the present embodiment includes, for example, a DSP or a CPU for enforcing the commands of a control program for realizing the foregoing respective functions; a ROM (Read Only Memory) for storing the program; a RAM (Random Access Memory) for developing the program; and a storage device (storage medium) such as a memory for storing the program and the various data. With these components, the objective of the present invention is achieved by implementing the image forming apparatus with a computer-readable program medium which stores the program code (execute form program, intermediate code program, source program: software for realizing the foregoing functions), and reading out (enforcing) the program code from the storage medium by the computer (or, by CPU, DSP).

Examples of the program medium include (a) a tape system such as a magnetic tape, a cassette tape or the like, (b) a disk system which includes a magnetic disk such as a Floppy Disk®, a hard disk or the like and an optical disk such as a CD-ROM, an MO, an MD, a DVD or the like, (c) a card system such as an IC card (inclusive of a memory card), an optical card or the like, and (d) a semiconductor memory such as a mask ROM, an EPROM, an EEPROM, a flash ROM.

Further, the remote control reception circuit may be constituted to be connectable to a communication network, so as to allow provision of the program code via a communication network. The communication network is not particularly limited, and it may be: the Internet, Intranet, Extranet, LAN, ISDN, VAN, CATV communication network, virtual private network, telecommunication network, mobile body communication network, satellite communication network etc. Further, a transmission medium for constituting the communication network is not particularly limited, and it may be wired based, such as IEEE1394, USB, power-line carrier, cable TV line, telephone line, ADSL line, or radio based, such as infrared medium such as IrDA, remote control, Bluetooth®, 802.11 radio, HDR, mobile phone network, satellite communication line, ground wave digital network. Note that, the present invention may be realized in the form of a carrier wave, or a data signal line that realize the program code by electronic transmission.

In the image forming apparatus according to the present embodiment, each of the blocks, particularly the small domain generation section 65, the toner quantity equivalent value counting section 70, the total toner quantity equivalent value calculation section 80, and the CPU 90 may be constituted of a hardware logic, or may be realized by software.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image forming apparatus for carrying out image forming in an electrophotography mode by processing a multi-valued image, the image forming apparatus comprising:

a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data;

a total toner quantity equivalent value calculation section for determining a total toner quantity equivalent value by accumulating the toner quantity equivalent values of the all pixels of the multi-valued image calculated by the toner quantity equivalent value calculation section; and a control section for setting conditions for process control when the total toner quantity equivalent value reaches a predetermined value.

2. An image forming apparatus for carrying out image forming in an electrophotography mode by processing a multi-valued image, the image forming apparatus comprising:

a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data;

a total toner quantity equivalent value calculation section for determining a total toner quantity equivalent value by accumulating the toner quantity equivalent values of the all pixels of the multi-valued image calculated by the toner quantity equivalent value calculation section; and a control section for notifying a user of toner residue quantity when the total toner quantity equivalent value reaches a predetermined value.

3. An image forming apparatus for carrying out image forming in an electrophotography mode by processing a multi-valued image, the image forming apparatus comprising:

a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data; and a total toner quantity equivalent value calculation section for determining a total toner quantity equivalent value by accumulating the toner quantity equivalent values of the all pixels of the multi-valued image calculated by the toner quantity equivalent value calculation section, the toner quantity equivalent value calculation section storing a plurality kinds of said correlation between the gradation data of said at least one other pixel of the small domain and an actual toner consumption of the pixel subjected to toner quantity equivalent value calculation, and selects one kind according to usage circumstances.

4. A method for operating an image forming apparatus which carries out image forming in an electrophotography mode by processing a multi-valued image, the method comprising:

using a processor for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

converting gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, so as to determine toner quantity equivalent values of all pixels of the multi-valued image based on the toner quantity equivalent value converted from the gradation data;

determining a total toner quantity equivalent value by accumulating the toner quantity equivalent values of the all pixels of the multi-valued image; and setting conditions for process control when the total toner quantity equivalent value reaches a predetermined value.

5. A method for operating an image forming apparatus which carries out image forming in an electrophotography mode by processing a multi-valued image, the method comprising:

using a processor for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

converting gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, so as to determine toner quantity equivalent values of all pixels of the multi-valued image based on the toner quantity equivalent value converted from the gradation data;

determining a total toner quantity equivalent value by accumulating the toner quantity equivalent values of the all pixels of the multi-valued image; and notifying a user of toner residue quantity when the total toner quantity equivalent value reaches a predetermined value.

6. A method for operating an image forming apparatus which carries out image forming in an electrophotography mode by processing a multi-valued image, the method comprising:

using a processor for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

converting gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, so as to determine toner quantity equivalent values of all pixels of the multi-valued image based on the toner quantity equivalent value converted from the gradation data;

determining a total toner quantity equivalent value by accumulating the toner quantity equivalent values of the all pixels of the multi-valued image;

storing a plurality kinds of said correlation between the gradation data of said at least one other pixel of the small domain and an actual toner consumption of the pixel subjected to toner quantity equivalent value calculation; and selecting one kind according to usage circumstances.

7. A storage medium which stores a program for operating an image forming apparatus which carries out image forming in an electrophotography mode by processing a multi-valued image, the program causing a computer to function as:

a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data;

a total toner quantity equivalent value calculation section for determining a total toner quantity equivalent value by accumulating the toner quantity equivalent values of the all pixels of the multi-valued image calculated by the toner quantity equivalent value calculation section; and a control section for setting conditions for process control when the total toner quantity equivalent value reaches a predetermined value.

8. A storage medium which stores a program for operating an image forming apparatus which carries out image forming in an electrophotography mode by processing a multi-valued image, the program causing a computer to function as:

a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data;

a total toner quantity equivalent value calculation section for determining a total toner quantity equivalent value by accumulating the toner quantity equivalent values of the all pixels of the multi-valued image calculated by the toner quantity equivalent value calculation section; and a control section for notifying a user of toner residue quantity when the total toner quantity equivalent value reaches a predetermined value.

9. A storage medium which stores a program for operating an image forming apparatus which carries out image forming in an electrophotography mode by processing a multi-valued image, the program causing a computer to function as:

a small domain generation section for generating, in the processed multi-valued image, a plurality of small domains each constituted of a plurality of pixels such that each of the plurality of pixels constituting the plurality of small domains is included as a pixel for subjection to toner quantity equivalent value calculation in only one of the plurality of small domains, so as to respectively convert pixels of the multi-valued image into count values relative to toner consumption quantity;

a toner quantity equivalent value calculation section which converts gradation data of the pixel to be subjected to toner quantity equivalent value calculation into a toner quantity equivalent value, using (i) the gradation data of said pixel and (ii) the gradation data of at least one other pixel in the same small domain, and with reference to a previously-stored correlation between the gradation data of said at least one other pixel of the small domain and an actual toner consumption of the pixel subjected to toner quantity equivalent value calculation, the toner quantity equivalent value calculation section determining toner quantity equivalent values of all pixels of the multi-valued image based on the toner quantity equivalent value converted from the gradation data; and a total toner quantity equivalent value calculation section for determining a total toner quantity equivalent value by accumulating the toner quantity equivalent values of the all pixels of the multi-valued image calculated by the toner quantity equivalent value calculation section, the toner quantity equivalent value calculation section storing a plurality kinds of said correlation between the gradation data of said at least one other pixel of the small domain and an actual toner consumption of the pixel subjected to toner quantity equivalent value calculation, and selects one kind according to usage circumstances.

* * * * *